United States Patent
Takahashi et al.

(10) Patent No.: US 8,917,021 B2
(45) Date of Patent: Dec. 23, 2014

(54) POWER SUPPLY APPARATUS AND LUMINAIRE

(71) Applicant: Toshiba Lighting & Technology Corporation, Kanagawa (JP)

(72) Inventors: Yuji Takahashi, Kanagawa (JP); Hirokazu Otake, Kanagawa (JP); Noriyuki Kitamura, Kanagawa (JP); Hiroshi Akahoshi, Kanagawa (JP)

(73) Assignee: Toshiba Lighting & Technology, Kanagawa (JP)

( * ) Notice: Subject to any disclaimer, the term of this patent is extended or adjusted under 35 U.S.C. 154(b) by 35 days.

(21) Appl. No.: 13/729,993

(22) Filed: Dec. 28, 2012

(65) Prior Publication Data
US 2014/0084791 A1   Mar. 27, 2014

(30) Foreign Application Priority Data
Sep. 24, 2012 (JP) ................. 2012-210197

(51) Int. Cl.
*H01J 1/52*   (2006.01)
*H01J 5/02*   (2006.01)
*H05B 37/02*   (2006.01)
*H02M 1/12*   (2006.01)
*H05B 37/00*   (2006.01)

(52) U.S. Cl.
CPC .............. *H05B 37/02* (2013.01); *H02M 1/126* (2013.01); *H05B 37/00* (2013.01); *H02M 2001/123* (2013.01)

USPC .......... 315/85; 315/185 R; 315/188; 315/246; 315/247

(58) Field of Classification Search
None
See application file for complete search history.

(56) References Cited

U.S. PATENT DOCUMENTS

2002/0113559 A1* 8/2002 Lam .............................. 315/224
2007/0138971 A1* 6/2007 Chen ......................... 315/209 R
2012/0153857 A1  6/2012 Han et al.

FOREIGN PATENT DOCUMENTS

| EP | 1 564 875 A1 | 8/2005 |
| EP | 2 408 093 A2 | 1/2012 |
| JP | 4014577 | 11/2007 |
| JP | 2010-148333 A | 7/2010 |
| WO | 2012/109703 A1 | 8/2012 |

OTHER PUBLICATIONS

European Search Report dated Mar. 6, 2014 for Application No. 12 19 5815.

* cited by examiner

*Primary Examiner* — Anh Tran
(74) *Attorney, Agent, or Firm* — Patterson & Sheridan LLP

(57) ABSTRACT

A power supply apparatus of an embodiment includes a first filter, a second filter, and a switching power supply. The first filter and the second filter attenuate a common mode current to a level lower than a normal mode current. The switching power supply is connected between the first filter and the second filter, and supplies electric power to an illumination load via the second filter.

17 Claims, 4 Drawing Sheets

US 8,917,021 B2

POWER SUPPLY APPARATUS AND LUMINAIRE

CROSS-REFERENCE TO RELATED APPLICATIONS

This application is based upon and claims the benefit of priority from the prior Japanese Patent Application No. 2012-210197, filed on Sep. 24, 2012; the entire contents of which are incorporated herein by reference.

FIELD

Embodiments described herein relate generally to a power supply apparatus and a luminaire.

BACKGROUND

There is a switching power supply configured to generate a predetermined voltage and current using, for example, a switching element as a power supply configured to illuminate an illumination light source. In such a switching power supply, a high-frequency current is generated by switching the switching element intermittently between ON and OFF. Therefore, Electro Magnetic Interference (EMI) caused by a switching noise is generated, and hence a noise enters an input line and an output line. Since a switching frequency is increased in association with high-efficiency and reduction in size, the influence of the EMI is also increased.

DETAILED DESCRIPTION

Figure 1:
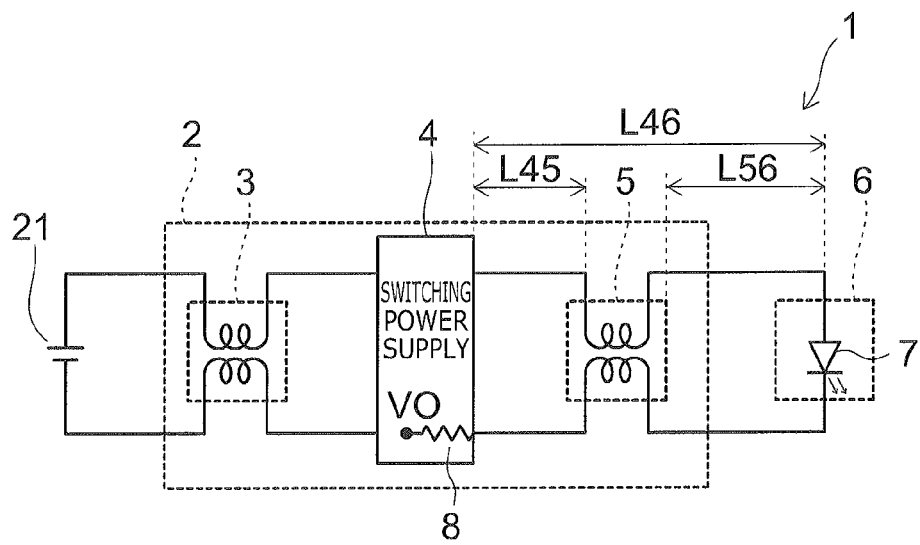
FIG. 1 is a block diagram illustrating a luminaire including a power supply apparatus according to a first embodiment.

In general, according to one embodiment, a power supply apparatus includes a first filter, a second filter, and a switching power supply. The first filter and the second filter attenuate a common mode current to a level lower than a normal mode current. The switching power supply is connected between the first filter and the second filter, and supplies electric power to an illumination load via the second filter.

Referring now to the drawings, exemplary embodiments will be described in detail. In this specification of the application and respective drawings, the same components as those described relating to already presented drawings are designated by the same reference numerals and detailed description will be omitted as needed.

First Embodiment

FIG. 1 is a block diagram illustrating a luminaire including a power supply apparatus according to a first embodiment.
As illustrated in FIG. 1, a luminaire 1 includes a power supply apparatus 2 and an illumination load 6. The luminaire 1 receives a supply of electric power from a power source 21 and illuminates the illumination load 6. The power source 21 is a DC power supply.

The power supply apparatus 2 includes a first filter 3, a switching power supply 4, and a second filter 5. The first filter 3 and the second filter 5 are, for example, common mode choke coils, and are filters configured to attenuate a common mode current in a high-frequency current flowing between a pair of input terminals and a pair of output terminals of the filter to a level lower than a normal mode current.

Here, the normal mode current is a current flowing through a pair of input lines connected respectively to the pair of input terminals in an opposite direction, and is a current flowing through a pair of output lines connected respectively to the pair of output terminals in the opposite direction. The normal mode current transmits signals or electric power between the pair of input terminals and the pair of output terminals.

The common mode current is a current flowing through the pair of input lines connected respectively to the pair of input terminals in the same direction, and is a current flowing through the pair of output lines connected respectively to the pair of output terminals in the same direction. The common mode current flows between each of input lines and the ground and between each of output lines and the ground.

Figure 2:
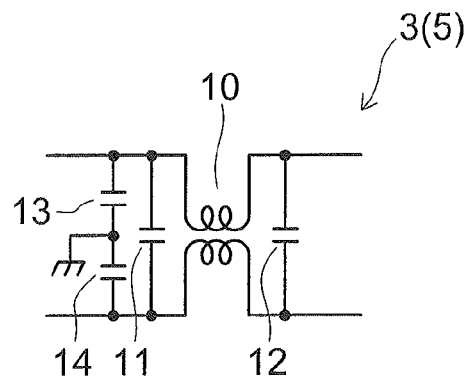
FIG. 2 is a circuit diagram illustrating a first filter.

FIG. 2 is a circuit diagram illustrating the first filter or the second filter.

The first filter 3 and the second filter 5 may have the same configuration, and may have different configurations in presence or absence of a capacitor, or the number of common mode choke coils 10. Here, the second filter 5 will be described.

The second filter 5 includes the common mode choke coil 10 and capacitors 11, 12, 13, and 14. The common mode choke coil 10 includes winding wires configured to generate a magnetic field in a direction opposite from that of the normal mode current and cancel out the magnetic fields. Therefore, the common mode choke coil 10 has a low impedance with respect to the normal mode current. In contrast, the common mode choke coil 10 generates the magnetic field in the same direction as that of the common mode current and hence sums the magnetic fields. Therefore, the common mode choke coil 10 functions as an inductor with respect to the common mode current, and has a high impedance.

The capacitor 11 is connected between a pair of input terminals of the common mode choke coil 10, and the capacitor 12 is connected between a pair of output terminals of the common mode choke coil 10. The capacitors 11 and 12 reduce a normal mode noise.

The capacitors 13 and 14 are connected in series between the pair of input terminals of the common mode choke coil 10, and a connecting point between the capacitors 13 and 14 is grounded. The capacitors 13 and 14 reduce a common mode noise.

The second filter 5 only has to have, for example, the common mode choke coil 10, and does not have to have the capacitors 11, 12, 13, and 14. In the same manner as the capacitors 13 and 14, a capacitor connected in series and is grounded at a connecting point may be provided in parallel to the capacitor 12. The first filter 3 may have a plurality of the common mode choke coils 10.

At least one of the first filter 3 and the second filter 5 includes, for example, a magnetic material having a higher specific magnetic permeability with respect to a current lower than the normal mode current in comparison with the specific magnetic permeability with respect to the normal mode current. Also, at least one of the first filter 3 and the second filter 5 includes, for example, a magnetic material formed of amorphous metal. The first filter 3 and the second filter 5 may have the same configuration, and may have different configurations.

Returning back to FIG. 1, the switching power supply 4 is connected between the first filter 3 and the second filter 5 to convert electric power supplied from the power source 21 via the first filter 3 and supplies the electric power to the illumination load via the second filter 5. The switching power supply 4 is, for example, a DC-DC converter, and is, for example, a chopper circuit, and is driven so as to be switched at frequencies equal to or higher than 100 kHz. The switching power supply 4 may have a detection resistor 8 configured to detect an electric current of the illumination load 6 in the interior thereof and is capable of controlling an output current to be a predetermined value. The detection resistor is connected to, for example, a reference potential V0. The switching power supply 4 only have to be capable of converting the electric power supplied from the power source 21 into predetermined output power and outputting the same, and the configuration thereof is arbitrary.

The illumination load 6 is connected to a pair of output terminals of the second filter 5, which are output terminals of the power supply apparatus 2. The illumination load 6 includes, for example, an LED 7 as an illumination light source 7, and is illuminated by receiving a supply of electric power from the switching power supply 4 via the second filter 5. The illumination load 6 is provided, for example, so that a line length L45 between the switching power supply 4 and the second filter 5 is shorter than a line length L56 between the second filter 5 and the illumination load 6.

The illumination load 6 may have a plurality of the illumination light sources 7 connected in series or in parallel.

Figure 3:
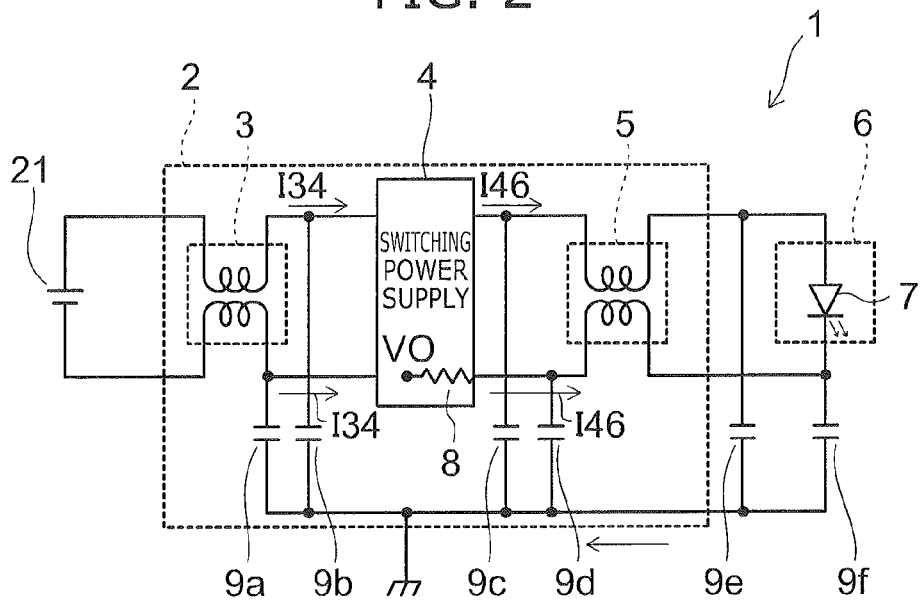
FIG. 3 is a circuit diagram explaining a common mode current in the luminaire.

FIG. 3 is a circuit diagram explaining a common mode current in the luminaire.

The switching power supply 4 converts supplied electric power by, for example, driving the switching element so as to be switched at a high frequency. Therefore, an input current and an output current of the switching power supply 4 include high-frequency switching noises.

Since the normal mode current flowing between the lines on the input side of the switching power supply 4 flows between the lines in the directions opposite from each other, electromagnetic radiation caused by the switching noises is reduced. As regards the normal mode current flowing between the lines on the output side of the switching power supply 4, the electromagnetic radiation caused by the switching noise is reduced as well. Also, by reducing the distance between the lines, the electromagnetic radiation caused by the switching noise may further be reduced.

In contrast, a common mode current 134 flows between each of input lines of the switching power supply 4 and the ground. Also, a common mode current 146 flows between each of output lines of the switching power supply 4 and the ground.

In general, at least one of the input terminals and the output terminals of the switching power supply is not grounded in many cases, and the input line and the output line of the switching power supply are coupled to the ground by, for example, stray capacitances 9a, 9b, 9c, and 9d.

Also, even when at least one of the input terminals and the output terminals of the switching power supply is grounded, impedances of the input line and the output line are increased with respect to the high-frequency switching noise, and are coupled by, for example, the stray capacitances 9a, 9b, 9c, and 9d.

Consequently, the common mode current 134 flows between the input line and the ground on the input side of the switching power supply 4. On the output side of the switching power supply 4, a common mode current 146 flows between the output line and the ground.

The common mode currents 134 and 146 flow between the lines in the same direction with each other and flow by forming a large loop with the lines and the ground, so that the electromagnetic radiation is not reduced. Therefore, although the common mode currents 134 and 146 flowing between the input line and the output line of the switching power supply 4 and the ground are lower currents in comparison with the normal mode current, a great and high-frequency switching noise may be radiated.

Accordingly, in the first embodiment, the switching power supply 4 is connected between the first filter 3 and the second filter 5. The first filter 3 and the second filter 5 are the filters configured to attenuate the common mode current in the high-frequency current flowing between the pair of input terminals and the pair of output terminals to a level lower than the normal mode current.

The first filter 3 and the second filter 5 are, for example, the common mode choke coils, and have larger impedance with respect to the common mode current than to the normal mode current. Therefore, the first filter 3 and the second filter have impedance larger than the stray capacitance with respect to the high-frequency switching noise, and are capable of reducing the common mode current. Consequently, Electro Magnetic Interference caused by the switching noise that is generated by the switching power supply 4 may be reduced.

For example, in the power supply apparatus 2 of the luminaire 1, the distance between the switching power supply 4 and the illumination load 6 may be increased. Also, in order to obtain a predetermined light output, the illumination load 6 having the plurality of illumination light sources 7 connected in series or in parallel may be used. In such an illumination load 6, a large loop is formed between the illumination load 6 and the ground.

As described above, the switching power supply 4 may have the detection resistor 8 connected between the second filter 5 and the reference potential V0 and configured to detect the electric current of the illumination load 6 via the second filter 5. In this case, since the detection resistor 8, for example, is connected in series to the illumination load 6, the impedance between the lines and the ground is increased, and the common mode current flowing via stray capacitances 9e and 9f between the illumination load 6 and the ground may further be increased.

Therefore, if the second filter 5 is not provided, when the common mode current flows through the lines between the switching power supply 4 and the illumination load 6 due to the switching noise generated by the switching power supply 4, the Electro Magnetic Interference may be increased.

In contrast, in the first embodiment, since the second filter 5 is connected between the switching power supply 4 and the illumination load 6, the common mode current caused by the switching noise generated by the switching power supply 4 may be reduced. Consequently, the Electro Magnetic Interference may be reduced.

Also, even when the illumination load 6 is grounded, for example, via the detection resistor 8, the common mode current may be reduced, so that the Electro Magnetic Interference may be reduced.

Also, in the first embodiment, since the electric power is supplied from the power supply apparatus 2 via the first filter 3, the common mode current of the input line of the switching power supply 4 caused by the switching noise generated by the switching power supply 4 may be reduced. Consequently, the Electro Magnetic Interference may be reduced.

Figure 4A:
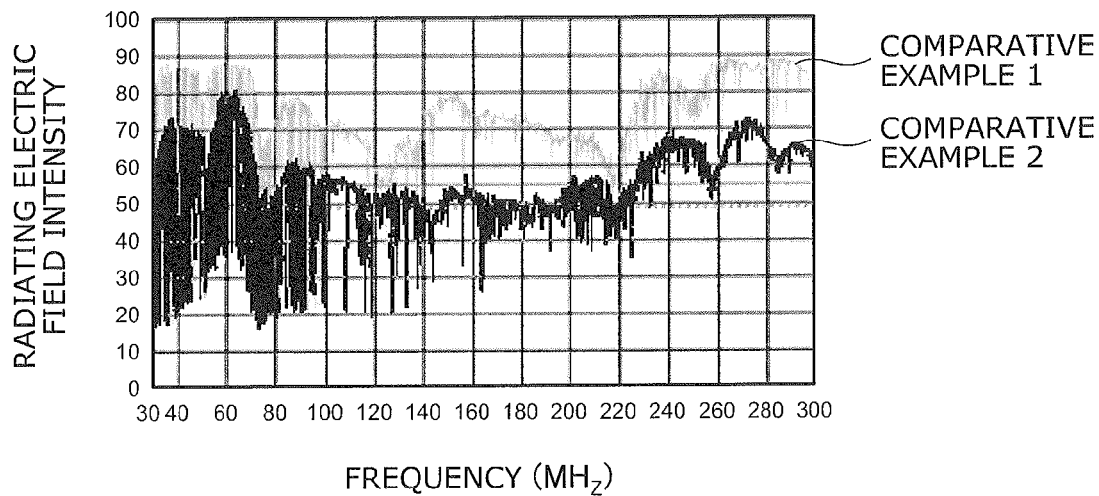
FIGS. 4A and 4B are characteristic diagrams illustrating an EMI of the luminaire.
Figure 4B:
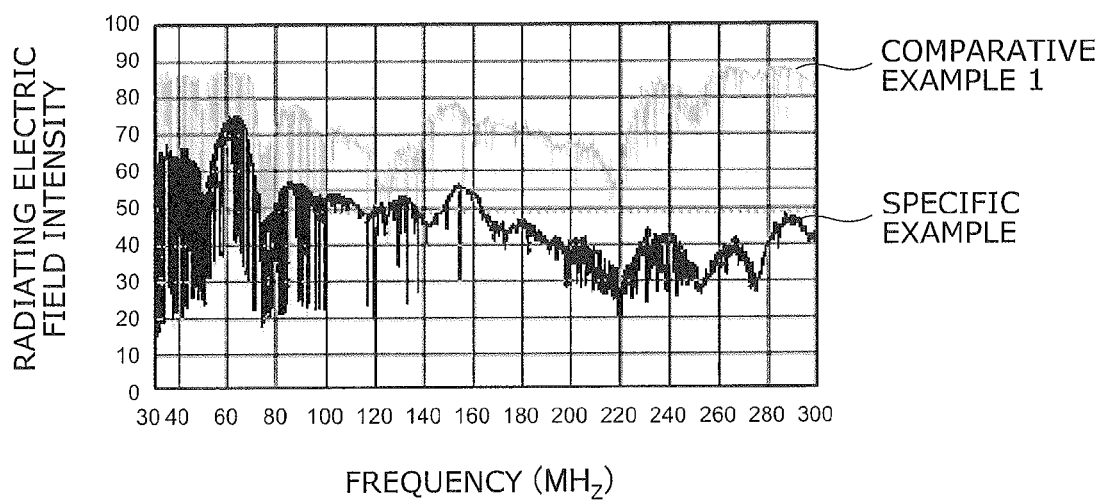

FIGS. 4A and 4B are characteristic drawings illustrating an EMI of the luminaire.

In FIGS. 4A and 4B, results of measurement of the radiating electric field intensity of the power supply apparatus 2 at frequencies from 30 MHz to 300 MHz are illustrated. In FIGS. 4A and 4B, a characteristic when the first filter and the second filter are not provided is illustrated by comparative example 1, a characteristic when only the first filter is provided and the second filter is not provided is illustrated by comparative example 2, and a characteristic when the first filter and the second filter are provided is illustrated by a specific example.

As illustrated in FIG. 4A, with the provision of the first filter 3 (comparative example 2 in FIG. 4A), the radiating electric field intensity may be reduced over an entire range of measurement frequencies in comparison with the case where the first filter 3 is not provided (comparative example 1 in FIG. 4A).

In contrast, as illustrated in FIG. 4B, with the provision of the first filter 3 and the second filter 5 (specific example in FIG. 4B), the radiating electric field intensity may be reduced over the entire range of measurement frequencies in comparison with the case where the first filter 3 is not provided (comparative example 1 in FIG. 4A). Also, with the provision of the first filter 3 and the second filter 5 (specific example in FIG. 4B), the radiating electric field intensity may be reduced in a range exceeding a frequency of 150 MHz even when comparing with the case where only the first filter 3 is provided and the second filter 5 is not provided (comparative example 2 in FIG. 4A).

The reason is supposed to be as follows. When the switching power supply 4 and the illumination load 6 are provided as in the power supply apparatus 2 of the luminaire 1, the common mode current flows through the lines between the switching power supply 4 and the illumination load 6 and the ground while tracing a large loop. It is also supposed that the common mode current may be reduced by providing the second filter 5 between the switching power supply 4 and the illumination load 6 and, consequently, the Electro Magnetic Interference to be radiated may be reduced.

In this manner, according to the first embodiment, since the first filter 3 and the second filter 5 suppress the common mode current, the Electro Magnetic Interference may be reduced.

Also, the Electro Magnetic Interference may be reduced by reducing the line length L45 between the switching power supply 4 and the second filter 5 to be shorter than the line length L56 between the second filter 5 and the illumination load 6.

Second Embodiment

Figure 5:
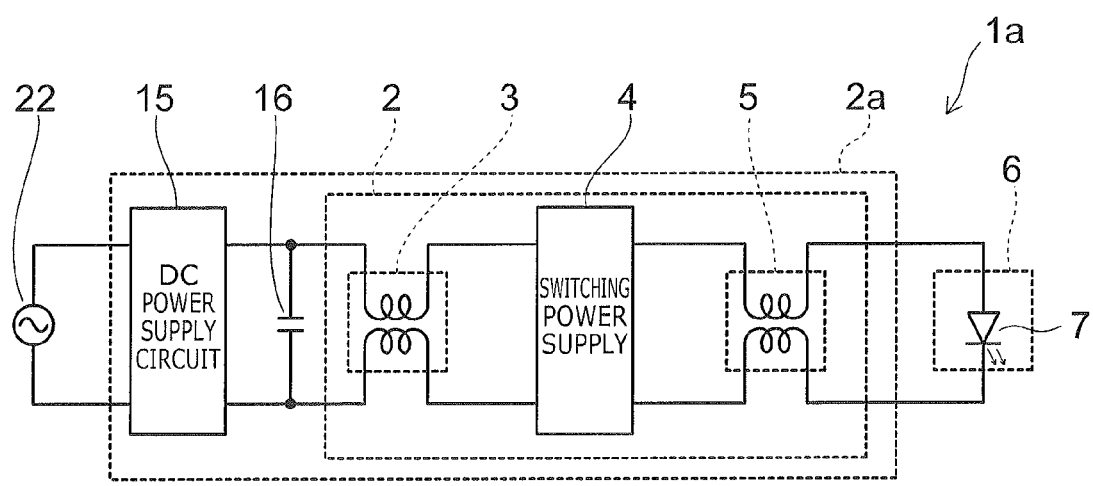
FIG. 5 is a block diagram illustrating a luminaire including a power supply apparatus according to a second embodiment.

FIG. 5 is a block diagram illustrating a luminaire including a power supply apparatus according to a second embodiment.

A luminaire 1a of the second embodiment is configured to have a power supply apparatus 2a instead of the power supply apparatus 2 of the luminaire 1 of the first embodiment.

The power supply apparatus 2a includes a DC power supply circuit 15 and a smoothing capacitor 16 in addition to the configuration of the power supply apparatus 2 of the first embodiment. The configuration of components other than the DC power supply circuit 15 and the smoothing capacitor 16 of the power supply apparatus 2a are the same as the configuration of the luminaire 1.

The DC power supply circuit 15 is a circuit configured to convert an AC voltage to a DC voltage, and may have an arbitrary configuration as long as the conversion from the AC voltage input from an AC power supply 22 to the DC voltage is achieved. The smoothing capacitor 16 is connected between a pair of output terminals of the DC power supply circuit 15 and between a pair of input terminals of the first filter 3. The smoothing capacitor 16 is charged by the DC power supply circuit 15, and functions as a DC power supply of the power supply apparatus 2. The AC power supply 22 is, for example, a commercial power supply.

According to the second embodiment, the same effect as the first embodiment may be obtained in the case where the power supply is the AC power supply.

Third Embodiment

Figure 6:
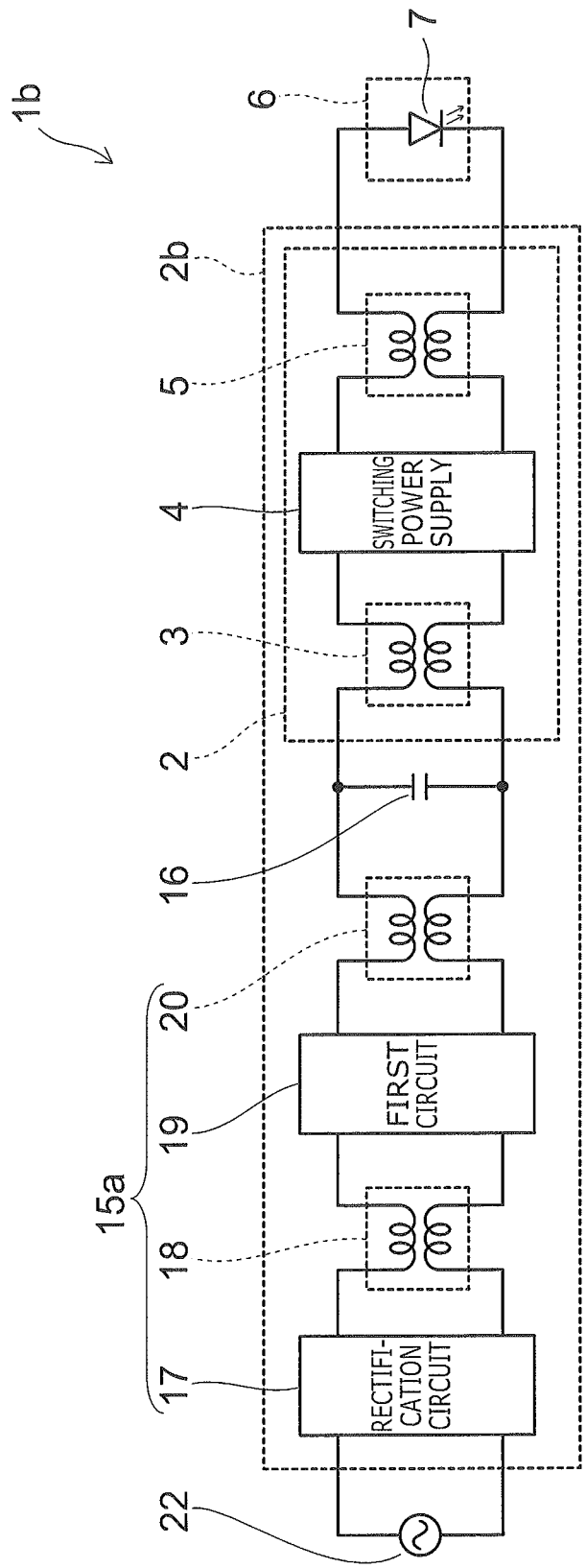
FIG. 6 is a block diagram illustrating a luminaire including a power supply apparatus according to a third embodiment.

FIG. 6 is a block diagram illustrating a luminaire including a power supply apparatus according to a third embodiment.

A luminaire 1b of the third embodiment is configured to have a power supply apparatus 2b instead of the power supply apparatus 2a of the luminaire 1a of the second embodiment.

The power supply apparatus 2b has a different configuration in the DC power supply circuit 15 in comparison with the power supply apparatus 2a of the second embodiment, and includes a DC power supply circuit 15a instead of the DC power supply circuit 15. Configurations other than the DC power supply circuit 15a of the power supply apparatus 2b are the same as the configurations of the power supply apparatus 2a.

The DC power supply circuit 15a includes a rectification circuit 17, a third filter 18, a first circuit 19, and a fourth filter 20. The DC power supply circuit 15a rectifies an AC voltage supplied from the AC power supply 22 to generate a DC voltage. The rectification circuit 17 may have an arbitrary configuration as long as the DC voltage is generated by rectifying the AC voltage.

The third filter 18 and the fourth filter 20 are, for example, common mode choke coils, and are filters configured to attenuate a common mode current in high-frequency currents flowing between a pair of input terminals (input ports) and a pair of output terminals (output ports) to a level lower than a normal mode current.

Each of the third filter 18 and the fourth filter 20 may have the same configuration as the first filter 3 or the second filter 5, or may have different configurations. Also, the third filter 18 and the fourth filter 20 may have the same configuration, or may have different configurations.

The first circuit 19 is connected between the third filter 18 and the fourth filter 20 and, for example, is a circuit configured to perform conversion of the DC voltage or power factor control by driving the switching element so as to be switched. The first circuit 19 is, for example, a DC-DC converter, and is, for example, a power factor correction circuit.

Since the first circuit 19 generates a high-frequency switching noise in the same manner as the switching power supply 4, the common mode current may flow through input lines and output lines of the first circuit 19 and hence the Electro Magnetic Interference may be radiated.

Accordingly, in the third embodiment, the first circuit 19 is connected between the third filter 18 and the fourth filter 20. Therefore, in the third embodiment as well, the Electro Magnetic Interference may be reduced by reducing the common mode current in the same manner as the effects of the first embodiment.

Although the embodiments have been described with reference to the detailed examples, the configurations are not limited to the embodiments, and various modifications are applicable.

For example, although the configuration in which the first filter 3, the second filter 5, the third filter 18, and the fourth filter 20 are provided is described in the third embodiment, a configuration in which a filter is provided in one of the switching power supply 4 and the first circuit 19 having a higher switching frequency is also applicable.

The illumination light source 7 is not limited to the LED, and an EL or an OLED is also applicable. The plurality of illumination light sources 7 may be connected to the illumination load 6 in series or in parallel.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the sprit of the inventions. The accompanying claims and their equivalents are intended to cover such forms or modifications as would fall within the scope and spirit of the inventions.

What is claimed is:

1. A power supply apparatus comprising:
   a first filter and a second filter configured to attenuate a common mode current to a level lower than a normal mode current;
   a switching power supply connected between the first filter and the second filter, and configured to supply electric power to an illumination load via the second filter; and
   a DC power supply circuit configured to supply a DC voltage to the switching power supply via the first filter, the DC power supply circuit including:
   a third filter and a fourth filter configured to attenuate the common mode current to a level lower than the normal mode current;
   a rectification circuit configured to rectify an AC voltage to generate a DC voltage and output the generated DC voltage to the third filter;
   a first circuit connected between the third filter and the fourth filter, and configured to perform conversion or power factor control of the DC voltage supplied through the third filter and output the DC voltage to the switching power supply through the fourth filter.

2. The apparatus according to claim 1, wherein the switching power supply includes a detection resistor, the detection resistor is connected between the second filter and the ground and configured to detect a current of the illumination load via the second filter.

3. The apparatus according to claim 1, wherein a line length for connecting the switching power supply and the second filter is shorter than a line length for connecting the second filter and the illumination load.

4. The apparatus according to claim 1, wherein the first filter and the second filter each have a common mode choke coil.

5. The apparatus according to claim 4, wherein at least one the first filter and the second filter includes a magnetic material having a first specific magnetic permeability with respect to a current lower than the normal mode current, that is larger than a second specific magnetic permeability with respect to the normal mode current.

6. The apparatus according to claim 4, wherein the first filter and the second filter each include a magnetic material of an amorphous metal.

7. The apparatus according to claim 4, further comprising a capacitor connected between a pair of input terminals or between a pair of output terminals of the second filter.

8. The apparatus according to claim 4, wherein at least one of the first filer and the second filter includes a capacitor connected between input terminals, between output terminals, or between one of the input terminals and the ground.

9. The apparatus according to claim 1, wherein the switching power supply includes a first DC-DC converter configured to convert an input DC voltage.

10. The apparatus according to claim 1, wherein at least one of the third filter and the fourth filter has the same configuration as the first filter or the second filter.

11. The apparatus according to claim 1, further comprising a smoothing capacitor connected between input terminals of the first filter.

12. The apparatus according to claim 1, wherein the switching power supply includes a chopper circuit.

13. A luminaire comprising:
    a first filter and a second filter configured to attenuate a common mode current to a level lower than a normal mode current;
    a switching power supply connected between the first filter and the second filter;
    an illumination load configured to receive a supply of electric power from the switching power supply via the second filter; and
    a DC power supply circuit configured to supply a DC voltage to the switching power supply via the first filter, the DC power supply circuit including:
    a third filter and a fourth filter configured to attenuate the common mode current to a level lower than the normal mode current;
    a rectification circuit configured to rectify an AC voltage to generate a DC voltage and output the generated DC voltage to the third filter;
    a first circuit connected between the third filter and the fourth filter, and configured to perform conversion or power factor control of the DC voltage supplied through the third filter and output the DC voltage to the switching power supply through the fourth filter.

14. The apparatus according to claim 13, further comprising a smoothing capacitor connected between the output terminals of the DC power supply circuit and input terminals of the first filter.

15. A method of reducing electromagnetic interference in a luminaire having a power supply apparatus connected between a DC power supply circuit and an illumination load, comprising:
    attenuating a common mode current to a level lower than a normal mode current using first and second filters and a switching power supply circuit connected between the first and second filters,
    wherein the DC power supply circuit is connected to the switching power supply circuit via the first filter and includes:
    a third filter and a fourth filter configured to attenuate the common mode current to a level lower than the normal mode current;
    a rectification circuit configured to rectify an AC voltage to generate a DC voltage and output the generated DC voltage to the third filter;
    a first circuit connected between the third filter and the fourth filter, and configured to perform conversion or power factor control of the DC voltage supplied through the third filter and output the DC voltage to the switching power supply circuit through the fourth filter.

16. The method of claim 15, wherein the first filter is a common mode choke coil connected between the DC power supply circuit and the switching power supply circuit and the second filter is a common mode choke coil connected between the switching power supply circuit and the illumination load.

17. The method of claim 16, wherein a line length between the switching power supply and the second filter and is shorter than a line length between the second filter and the illumination load.

* * * * *